United States Patent
Akinyemi et al.

(10) Patent No.: US 9,316,165 B2
(45) Date of Patent: Apr. 19, 2016

(54) METHOD FOR EXHAUST GAS RECIRCULATION RATE CONTROL

(75) Inventors: Omowoleola Chukuwuemeka Akinyemi, Niskayuna, NY (US); Adam Klingbeil, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 745 days.

(21) Appl. No.: 13/113,138

(22) Filed: May 23, 2011

(65) Prior Publication Data

US 2012/0298070 A1    Nov. 29, 2012

(51) Int. Cl.
- *F02M 25/07* (2006.01)
- *F02D 41/00* (2006.01)
- *F02D 41/08* (2006.01)

(52) U.S. Cl.
CPC ........ *F02D 41/0047* (2013.01); *F02D 41/0065* (2013.01); *F02D 41/0087* (2013.01); *F02D 41/08* (2013.01); *F02M 25/0707* (2013.01); *F02M 25/0749* (2013.01); *Y02T 10/47* (2013.01)

(58) Field of Classification Search
CPC ............ F02D 41/0087; F02D 41/0047; F02D 41/005; F02D 41/08; F02M 25/0749; Y02T 10/47
USPC ............ 123/198 F, 294, 481, 568.11, 568.21, 123/330, 332, 339.16, 568.15, 325, 698; 60/278, 279; 701/108, 112
See application file for complete search history.

(56) References Cited

U.S. PATENT DOCUMENTS

| | | | |
|---|---|---|---|
| 4,143,635 A * | 3/1979 | Iizuka et al. | 123/481 |
| 4,179,892 A * | 12/1979 | Heydrich | F02B 37/00 60/605.2 |
| 4,462,351 A * | 7/1984 | Fujii et al. | 123/198 F |
| 5,826,563 A | 10/1998 | Patel | |
| 6,286,489 B1 * | 9/2001 | Bailey | 123/568.11 |
| 6,543,230 B1 * | 4/2003 | Schmid | F02M 25/0707 123/568.11 |
| 6,789,531 B1 | 9/2004 | Remmels | |
| 6,823,835 B2 * | 11/2004 | Dunsworth et al. | 123/305 |
| 6,871,642 B1 * | 3/2005 | Osterwald | F02B 37/025 123/559.1 |
| 6,877,492 B1 * | 4/2005 | Osterwald | F02B 29/0437 123/568.11 |
| 6,948,475 B1 | 9/2005 | Wong | |
| 7,270,089 B2 | 9/2007 | Wong | |
| 7,801,664 B2 * | 9/2010 | Winstead | F02D 13/0207 123/198 F |

(Continued)

FOREIGN PATENT DOCUMENTS

EP    1146220 A1    10/2001

OTHER PUBLICATIONS

Faiz, Asif et al., "Air Pollution from Motor Vehicles: Standards and Technologies for Controlling Emissions", World Bank Technical Paper No. 308 (1996).

(Continued)

*Primary Examiner* — Hai Huynh
*Assistant Examiner* — Gonzalo Laguarda
(74) *Attorney, Agent, or Firm* — GE Global Patent Operation; John A. Kramer

(57) ABSTRACT

Various methods for controlling EGR rate are disclosed. In one embodiment, a method for controlling EGR rate in an engine comprises routing exhaust from a first cylinder group to an intake coupled to the engine, and not to atmosphere, routing exhaust from a second cylinder group to atmosphere, and, during a first engine operating condition, injecting fuel to each cylinder in the first cylinder group while injecting fuel to a subset of cylinders of the second cylinder group.

21 Claims, 5 Drawing Sheets

(56) References Cited

U.S. PATENT DOCUMENTS

| | | | |
|---|---|---|---|
| 7,849,835 B2 | 12/2010 | Tripathi | |
| 8,205,583 B2* | 6/2012 | Winstead | 123/58.8 |
| 8,291,891 B2* | 10/2012 | Alger et al. | 123/568.11 |
| 8,316,829 B2* | 11/2012 | Piper et al. | 123/568.21 |
| 8,915,081 B2* | 12/2014 | Hayman | F02B 47/08 |
| | | | 123/568.11 |
| 8,931,462 B2* | 1/2015 | Pappenheimer | F02D 41/005 |
| | | | 123/198 F |
| 2009/0308070 A1* | 12/2009 | Alger et al. | 60/602 |
| 2011/0289904 A1* | 12/2011 | Miyashita | 60/278 |
| 2012/0055444 A1* | 3/2012 | Tobergte et al. | 123/294 |
| 2012/0323465 A1* | 12/2012 | Peters et al. | 701/104 |
| 2012/0323470 A1* | 12/2012 | Klingbeil et al. | 701/108 |
| 2014/0034014 A1* | 2/2014 | Blythe et al. | 123/435 |

OTHER PUBLICATIONS

International Search Report and Written Opinion issued in connection with corresponding WO Application No. PCT/US2012/038496 dated Oct. 8, 2012.

* cited by examiner

METHOD FOR EXHAUST GAS RECIRCULATION RATE CONTROL

FIELD

Embodiments of the subject matter disclosed herein relate to exhaust gas recirculation systems and methods.

BACKGROUND

An exhaust gas recirculation (EGR) system may be included in a combustion engine to reduce combustion temperatures and lower emissions. In one example, under selected conditions, an EGR system may exclusively couple an exhaust manifold of a first group of cylinders to an intake manifold of an engine, and not to the atmosphere. Such cylinders are referred to as donor cylinders. By providing EGR to an intake in such a manner, the effective oxygen content of the intake air may be reduced, thus lowering the combustion temperature and reducing production of emissions such as NOx.

BRIEF DESCRIPTION

In one embodiment, a method for controlling EGR in an engine comprises routing exhaust from a first cylinder group to an intake coupled to the engine, and not to atmosphere, routing exhaust from a second cylinder group to atmosphere, and, during a first engine operating condition, injecting fuel to each cylinder in the first cylinder group while injecting fuel to a subset of cylinders of the second cylinder group.

By injecting fuel to each cylinder in the first cylinder group while injecting fuel to a subset of cylinders of the second cylinder group, an effective EGR rate to the intake (and thus delivered to all of the cylinders) can be increased during a first engine operating condition, even when the physical structure of the donor cylinders is maintained. For example, the first engine operating condition may be idle mode. By injecting fuel to each cylinder in the first cylinder group, or donor cylinder group, and injecting fuel to a subset of the second cylinder group, or non-donor cylinder group, a larger ratio of the injected fuel, and thus the combusted fuel and exhaust, will be directed to EGR, thus increasing the effective EGR rate. For example, preferential operation of the donor cylinders during skip-firing of the non-donor cylinders can increase the fraction of burned gases in the EGR, thus reducing NOx emissions.

In another example, a method for operating an internal combustion engine includes, during a plurality of engine cycles, firing each cylinder from a first cylinder group more often than each cylinder from a second cylinder group, the first cylinder group comprising donor cylinders and the second cylinder group comprising non-donor cylinders.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for an engine with a plurality of donor cylinders and a plurality of non-donor cylinders. In one example embodiment, a method includes injecting fuel to each cylinder in a donor cylinder group while injecting fuel to a subset of cylinders of a non-donor cylinder group. The subset of cylinders in the non-donor cylinder group may vary from one combustion cycle to the next, or be maintained over a plurality of combustion cycles, or combinations thereof. Operating with some cylinders completing a cycle without combusting may be referred to as "skip firing". Operation with only selected cylinders being fired during each engine cycle may be carried out preferentially biased to the donor cylinders as described herein. For example, during preferential donor cylinder skip-fire operation, in one engine cycle, every cylinder from the donor cylinder group may be fired while at least one but fewer than all the cylinders of the non-donor cylinder group are fired. In this manner, across multiple engine cycles, the donor cylinders may fire more often than the non-donor cylinders, even though each non-donor cylinder may fire at some point. In order to maintain desired engine speed during the skip fire operation, the amount of total fuel injected to all cylinders may be controlled such that each individual cylinder receives a higher amount of fuel during skip fire than when more or all cylinders are firing during each combustion cycle. By doing so, the EGR introduced into the intake may have proportionately less oxygen during skip fire than during normal operation at the same engine speed and load, effectively increasing the EGR rate to the intake.

In some embodiments, the engine is configured to be positioned in a vehicle, such as a rail vehicle. The above described configuration may be particularly advantageous in a rail vehicle due to the sustained periods of low load operation rail vehicles may undergo, for example sitting at idle mode during loading and unloading of cargo, idling in the yard, or other idle operation. Likewise, the operation described herein may be particularly useful during low load dynamic braking operation wherein braking energy is either electrically dissipated or stored in a battery system. "low-load" operation may comprise a mode of operation of the engine where a relatively low amount of work is performed by the engine, for example, low-load operation may be less than 50% of engine load. Conversely, a "high-load" operation of the engine may comprise a mode of operation where a relatively higher amount of work is performed by the engine, for example operation at greater than 50% engine load.

Figure 1:
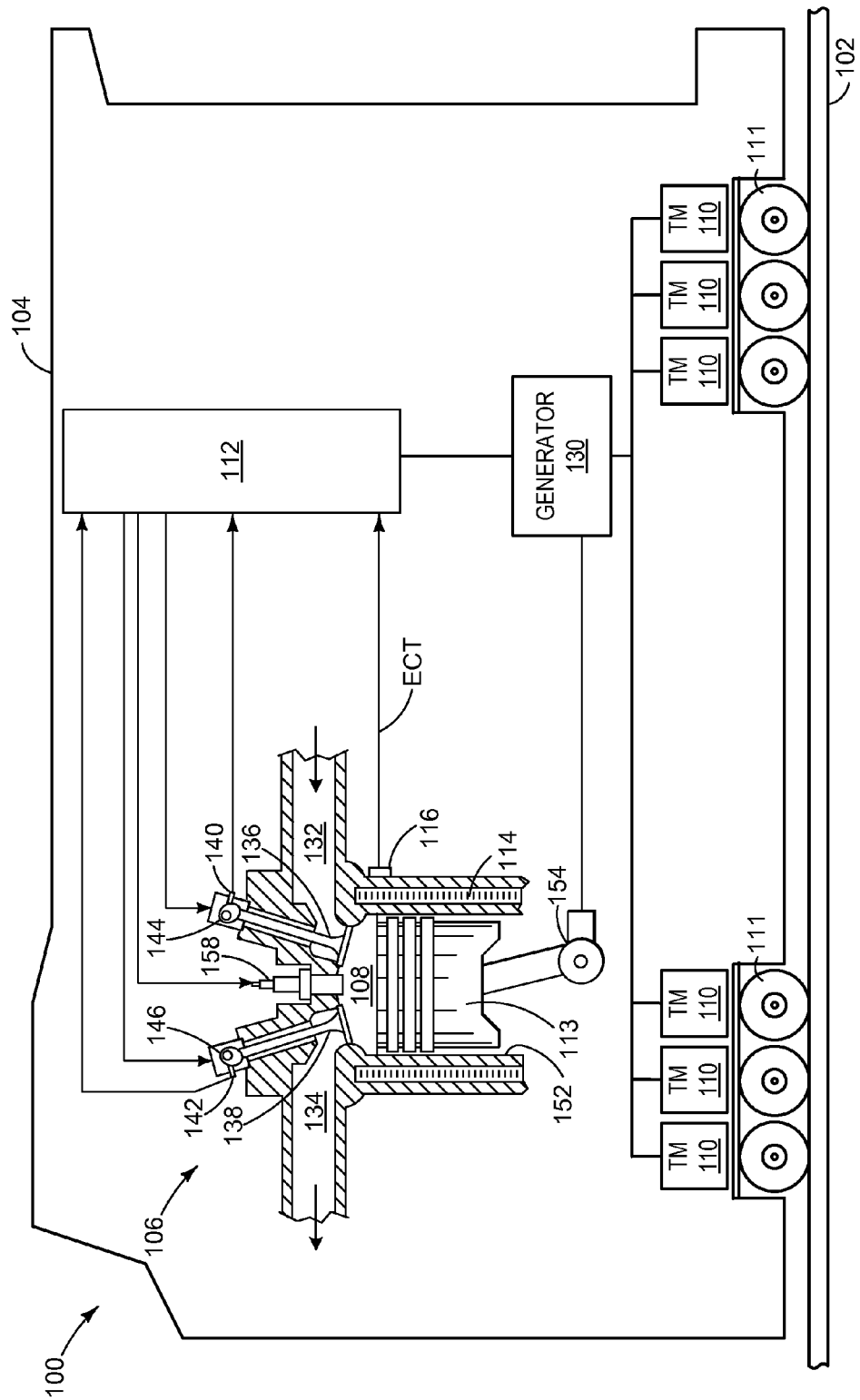
FIG. 1 shows a schematic diagram of an example embodiment of a rail vehicle with an engine according to an embodiment of the present disclosure.

With regard to FIG. 1, it shows a block diagram of an example embodiment of a vehicle system 100 (e.g., a locomotive system), herein depicted as a rail vehicle 104, configured to run on a rail 102 via a plurality of wheels 111. As depicted, the rail vehicle 104 includes an engine system 106 with an engine (described further with regard to FIG. 2). In other non-limiting embodiments, the engine system 106 may be a stationary engine system, such as in a power-plant application, or an engine system in a ship, on-highway vehicle or off-highway vehicle propulsion system.

In one example, the rail vehicle 104 is a diesel-electric vehicle. For example, the engine system 106 includes a diesel engine that generates a torque output that is transmitted to the generator 130. The generator 130 produces electrical power that may be stored and applied for subsequent propagation to a variety of downstream electrical components. For example, the generator 130 may provide electrical power to a plurality of traction motors 110. As depicted, the plurality of traction motors 110 are each connected to one of a plurality of wheels 111 to provide tractive power to propel the rail vehicle 104. One example rail vehicle configuration includes one traction motor per wheel. As depicted herein, six pairs of traction motors correspond to each of six pairs of wheels of the rail vehicle.

FIG. 1 depicts an example embodiment of a combustion chamber, or cylinder, of a multi-cylinder internal combustion engine 106. The engine 106 may be controlled at least partially by a control system including controller 112. In one example, the controller 112 includes a computer control system. The controller 112 may further include computer readable storage media (not shown) including code for enabling on-board monitoring and control of rail vehicle operation. The controller 112, while overseeing control and management of the vehicle system 100, may be configured to receive signals from a variety of engine sensors in order to determine operating parameters and operating conditions, and correspondingly adjust various engine actuators to control operation of the rail vehicle 104. For example, the controller 112 may receive a signal from a notch throttle (not shown) indicating an operator desired power output. The controller 112 may further receive signals from various engine sensors including, but not limited to, engine speed, engine load, boost pressure, exhaust pressure, ambient pressure, $CO_2$ levels, exhaust temperature, NOx emissions, engine coolant temperature (ECT) from temperature sensor 116 coupled to cooling sleeve 114, etc. Correspondingly, the controller 112 may control the vehicle system 100 by sending commands to various components such as traction motors, alternator, cylinder valves, throttle, fuel injectors, etc.

The cylinder (i.e., combustion chamber) 108 of engine 106 may include combustion chamber walls 152 with a piston 113 positioned therein. The piston 113 may be coupled to a crankshaft 154 so that reciprocating motion of the piston is translated into rotational motion of the crankshaft. In some embodiments, the engine 106 may be a four-stroke engine in which each of the cylinders fires in a firing order during two revolutions of the crankshaft 154. In other embodiments, the engine 106 may be a two-stroke engine in which each of the cylinders fires in a firing order during one revolution of the crankshaft 154.

The cylinder 108 receives intake air for combustion from an intake passage 132. The intake passage 132 receives ambient air from an air filter (not shown) that filters air from outside of the rail vehicle 104. The intake air passage 132 may communicate with other cylinders of engine 106 in addition to cylinder 108, for example.

Exhaust gas resulting from combustion in the engine 106 is supplied to an exhaust passage 134. Exhaust gas flows through the exhaust passage 134, to a turbocharger (not shown in FIG. 1) and out of an exhaust stack (not shown) of the rail vehicle 104. The exhaust passage 134 can further receive exhaust gases from other cylinders of engine 106 in addition to cylinder 108, for example. Further, an exhaust gas treatment system (not shown) including one or more exhaust gas treatment devices may be coupled to the exhaust passage 134. For example, the exhaust gas treatment system may include a selective catalytic reduction (SCR) system, a diesel oxidation catalyst (DOC), a diesel particulate filter (DPF), various other emission control devices, or combinations thereof.

In some embodiments, as will be described in greater detail below with reference to FIG. 2, the vehicle system may include more than one exhaust passage. For example, one group of cylinders may be coupled to a first exhaust manifold and another group of cylinders may be coupled to a second exhaust manifold. In this way, one of the groups of cylinders may be comprised exclusively of donor cylinders which recirculate exhaust gas to the intake passage 132 under selected operating conditions.

Continuing with FIG. 1, each cylinder of the engine 106 may include one or more intake valves and one or more exhaust valves. For example, the cylinder 108 is shown including at least one intake poppet valve 136 and at least one exhaust poppet valve 138 located in an upper region of cylinder 108. In some embodiments, each cylinder of the engine 106, including cylinder 108, may include at least two intake poppet valves and at least two exhaust poppet valves located at the cylinder head.

The intake valve 136 may be controlled by the controller 112 via actuator 144. Similarly, the exhaust valve 138 may be controlled by the controller 112 via actuator 146. During some conditions, the controller 112 may vary the signals provided to actuators 144 and 146 to control the opening and closing of the respective intake and exhaust valves. The position of intake valve 136 and exhaust valve 138 may be determined by respective valve position sensors 140 and 142, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of engine 106 may be configured with one or more fuel injectors for providing fuel thereto. As a non-limiting example, FIG. 1 shows the cylinder 108 is including a fuel injector 158. The fuel injector 158 is shown coupled directly to cylinder 108 for injecting fuel directly therein. In this manner, fuel injector 158 provides what is known as direct injection of a fuel into combustion cylinder 108. The fuel may be delivered to the fuel injector 158 from a high-pressure fuel system including a fuel tank, fuel pumps, and a fuel rail (not shown). In one example, the fuel is diesel fuel that is combusted in the engine through compression ignition. In other non-limiting embodiments, the second fuel may be gasoline, kerosene, biodiesel, or other petroleum distillates of similar density through compression ignition (and/or spark ignition).

In some embodiments, the controller 112 may control a frequency and/or duration of fuel injection individually for each fuel injector 158 of engine 106. For example, during skip fire operation, a first fuel injector may be controlled to inject a higher amount of fuel than a second fuel injector, which may be controlled to inject no fuel.

Figure 2:
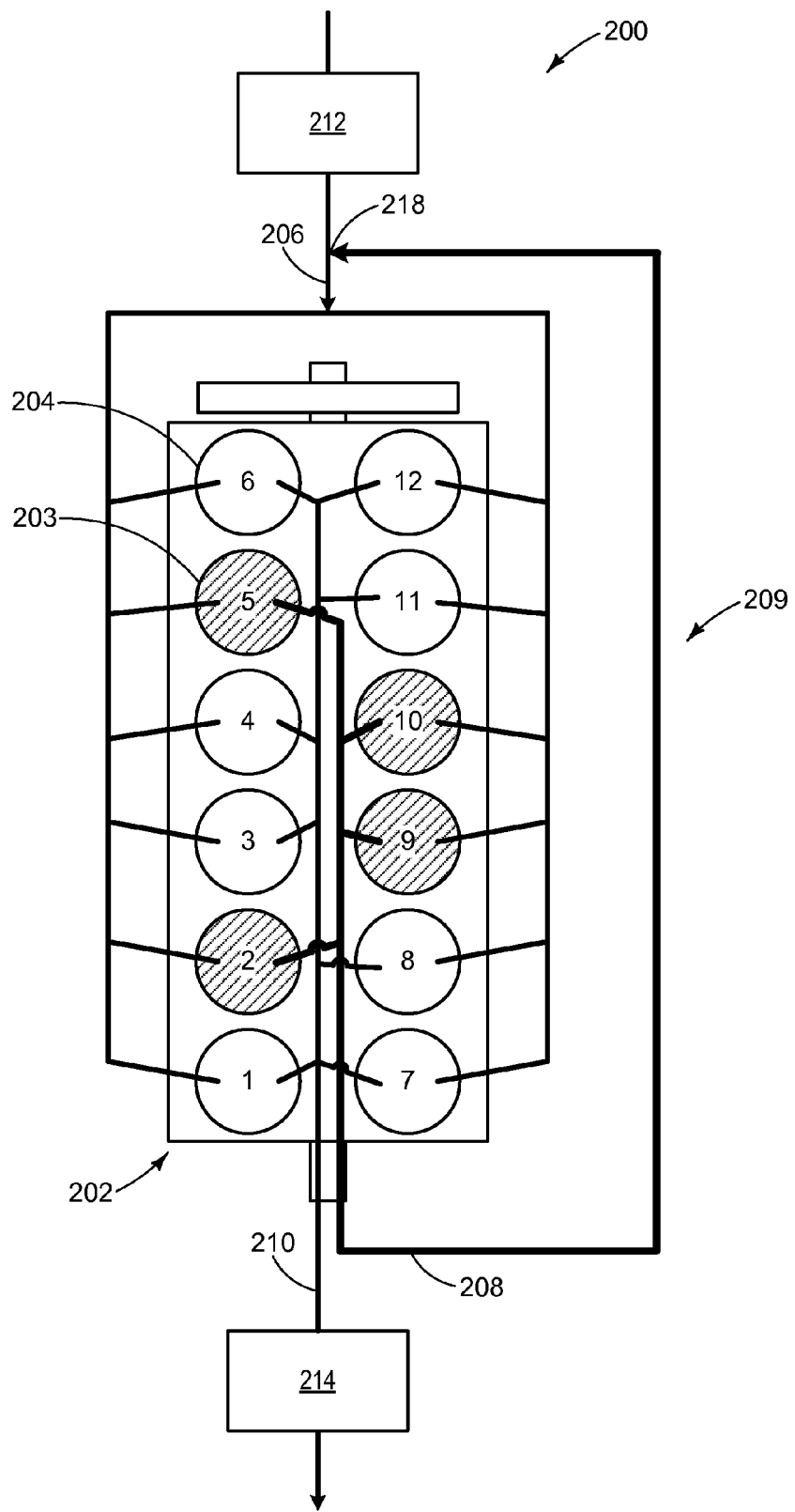
FIG. 2 shows a schematic diagram of an example embodiment of an engine with a plurality of donor cylinders and a plurality of non-donor cylinders.

FIG. 2 shows an example embodiment of a system 200 with an engine 202, such as engine 106 described above with reference to FIG. 1, having a plurality of donor cylinders 203 and a plurality of non-donor cylinders 204. In the example embodiment of FIG. 2, the engine 202 is a V-12 engine having twelve cylinders. In other examples, the engine may be a V-6, V-8, V-10, V-16, I-4, I-6, I-8, opposed 4, or another engine type.

In the example embodiment of FIG. 2, the donor cylinders 203 are depicted as a first group of cylinders comprising four cylinders (e.g., cylinders labeled 2, 5, 9, and 10). The non-donor cylinders 204 are depicted as a second group of cylinders comprising eight cylinders (e.g., cylinders labeled 1, 3, 4, 6, 7, 8, 11, and 12). In other embodiments, the engine may include at least one donor cylinder and at least one non-donor cylinder. For example, the engine may have six donor cylinders and six non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 2, the donor cylinders 203 are coupled to a first exhaust manifold 208 which is part of an exhaust gas recirculation (EGR) system 209. The first exhaust manifold 208 is coupled to the exhaust ports of the donor-cylinders. As such, in the present example, the donor cylinders 203 are coupled exclusively to the first exhaust manifold 208. Exhaust gas from each of the donor cylinders 203 is routed through the EGR system 209 to an exhaust gas inlet 218 in the intake passage 206

In the example embodiment illustrated in FIG. 2, the non-donor cylinders 204 are coupled to a second exhaust manifold 210. The second exhaust manifold 210 is coupled to the exhaust ports of at least the non-donor-cylinders, but, in some examples, may be coupled to exhaust ports of the donor cylinders. For example, exhaust gas from one or more of the donor cylinders may be directed to the second exhaust manifold 210 via a valve such that the amount of EGR may be reduced as desired, for example, during selected operating conditions. In the present example, the non-donor cylinders 204 are coupled exclusively to the second exhaust manifold 210. Exhaust gas from the non-donor cylinders 204 flows to an exhaust system 220. The exhaust system may include exhaust gas treatment devices, elements, and components, for example, a diesel oxidation catalyst, a particulate matter trap, hydrocarbon trap, an SCR catalyst, etc., as described above. Further, in the present example, exhaust gas from the non-donor cylinders 204 drives a turbine 214 of a turbocharger.

In embodiments in which the engine is a V-engine, the exhaust manifolds 208 and 210 may be inboard exhaust manifolds. For example, the exhaust ports of each of the cylinders are lined up on the inside of the V-shape. In other embodiments, the exhaust manifolds 208 and 210 may be outboard exhaust manifolds. For example, the exhaust ports of each of the cylinders are lined up on the outside of the V-shape.

As depicted in FIG. 2, the engine 202 is configured with a turbocharger including the exhaust turbine 214 arranged along the second exhaust manifold 210, and a compressor 212 arranged in the intake passage 206. The compressor 212 may be at least partially powered by the exhaust turbine 214 via a shaft (not shown). As shown in FIG. 2, the exhaust gas inlet 218 is downstream of the compressor 212 in the intake passage 206. The turbocharger increases air charge of ambient air drawn into the intake passage 206 in order to provide greater charge density during combustion to increase power output and/or engine-operating efficiency. While in this case a single turbocharger is included, the system may include multiple turbine and/or compressor stages.

Further, as shown in FIG. 2, at least two of the donor cylinders 203 may be positioned contiguously (e.g., immediately adjacent to one another) in an engine bank. As an example, engine 202 may be a V-engine with two engine banks. For example, cylinders 1-6 are disposed in one bank and cylinders 7-12 are disposed in the other bank. In the present example, donor cylinders 9 and 10 are contiguous. In such a configuration, a size of the first exhaust manifold 208 may be reduced, and therefore, a volume of space occupied by the first exhaust manifold 208 may be reduced, for example, as the donor cylinders are positioned adjacent each other. Thus, the engine may be positioned in a vehicle in which packaging space is limited, such as a locomotive, for example.

In a V-12 engine, such as depicted in FIG. 2, the engine may have a cylinder firing order such as 1-7-5-11-3-9-6-12-2-8-4-10, for example, in which cylinder 1 fires first, cylinder 7 fires second, cylinder 5 fires third, and so on. In other examples, the cylinders may have a different firing order. During normal, non-skip fire conditions, each cylinder is fired once every engine cycle, or once every 720 crankshaft degrees, according to the cylinder firing order. In the embodiment depicted in FIG. 2, the engine 202 comprises four donor cylinders, and thus in non-skip fire conditions, four out of twelve fired cylinders are donor cylinders. As a result, approximately 33% of the gasses inducted into the cylinders may derive from the donor cylinders.

During non-preferential skip fire operation, a subset of the donor and non-donor cylinders are fired each engine cycle. The number of cylinders fired each cycle may be selected based on operating conditions such as fuel demand. The cylinders in each subset may change each engine cycle such that every cylinder is skipped at least once within a predetermined number of engine cycles. Further, within the predetermined number of engine cycles, every cylinder, including both donor and non-donor cylinders, is fired the same amount of times.

During preferential donor cylinder skip fire conditions, the donor cylinders may comprise a different proportion of the fired cylinders. For example, during a preferential skip fire routine wherein the donor cylinders are preferentially fired, the donor cylinders may comprise four out of nine fired cylinders, or four out of six fired cylinders, or in some embodiments, the donor cylinders may be the only cylinders fired. Any proportion of donor cylinders fired is within the scope of this disclosure. The proportion of donor cylinders fired may be selected based upon a desired effective EGR rate to reduce NOx levels. For example, in the case of 4 donor cylinders and 8 non-donor cylinders, if half of the non-donors are skip-fired and none of the donor cylinders are skip-fired, then the effective EGR rate is increased from 33% to 50%.

Figure 3:
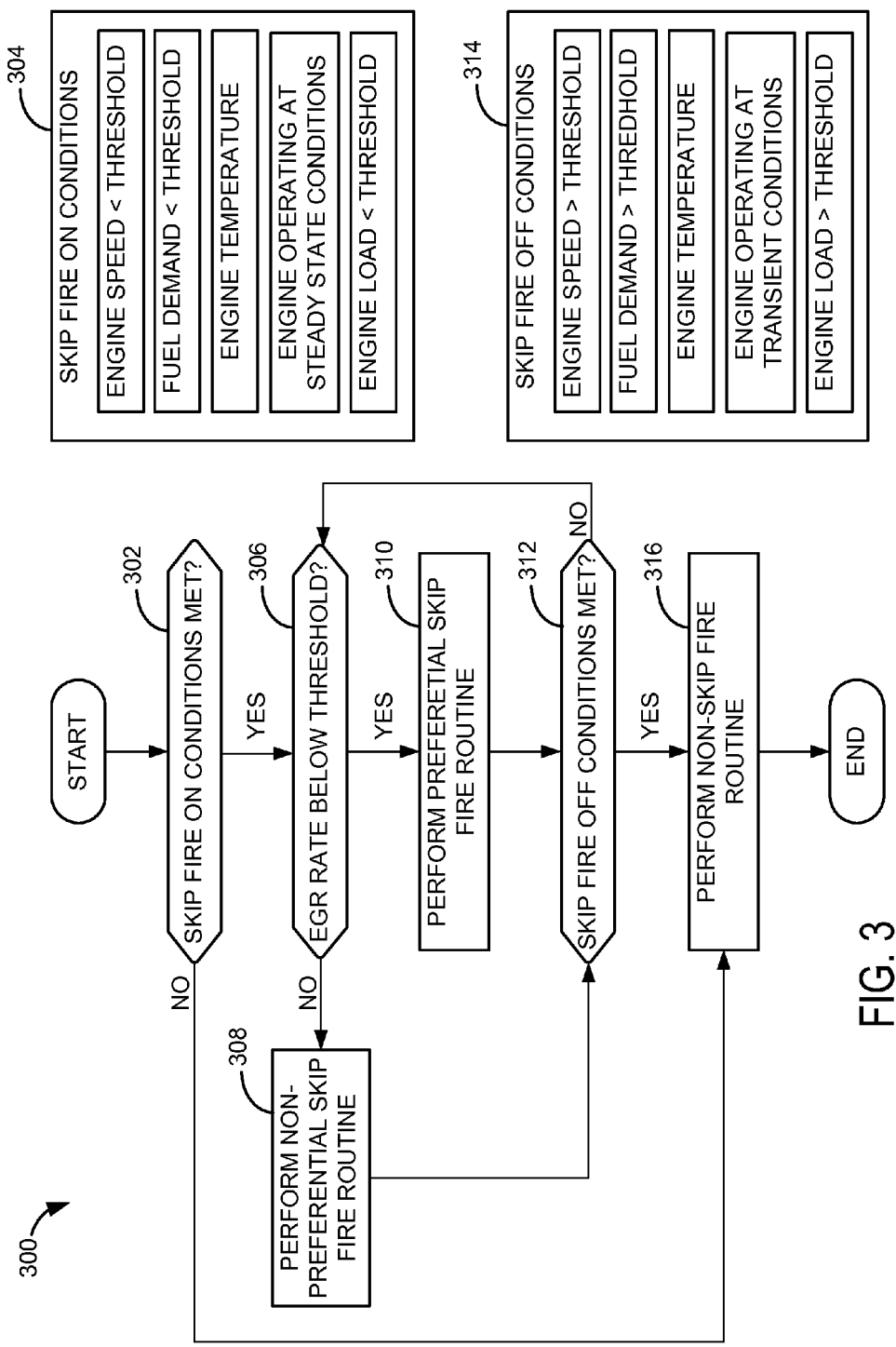
FIG. 3 shows a flow chart illustrating an example routine for determining a cylinder firing protocol.
Figure 4:
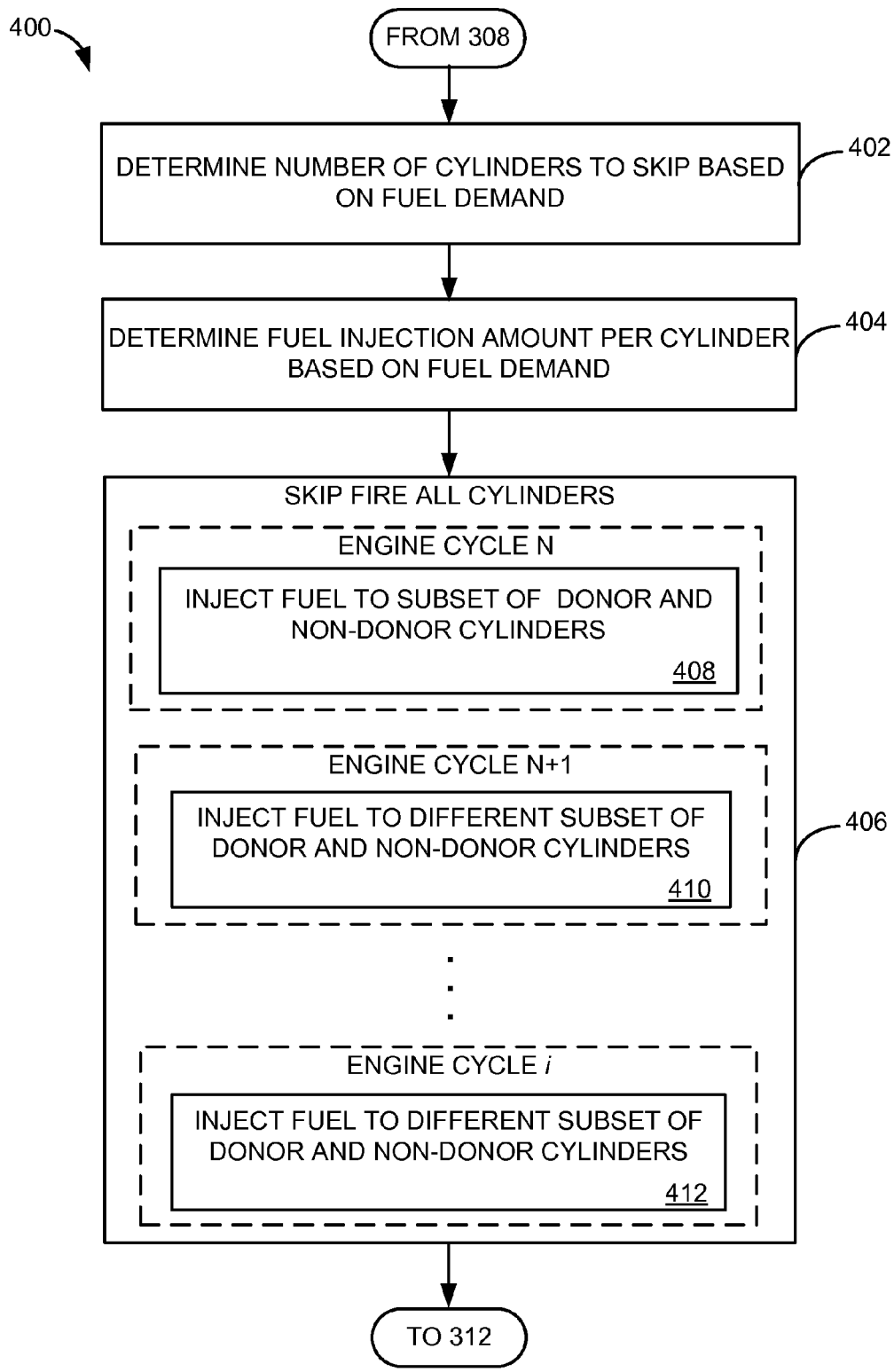
FIG. 4 shows a flow chart of an example method for performing a non-preferential skip fire routine.
Figure 5:
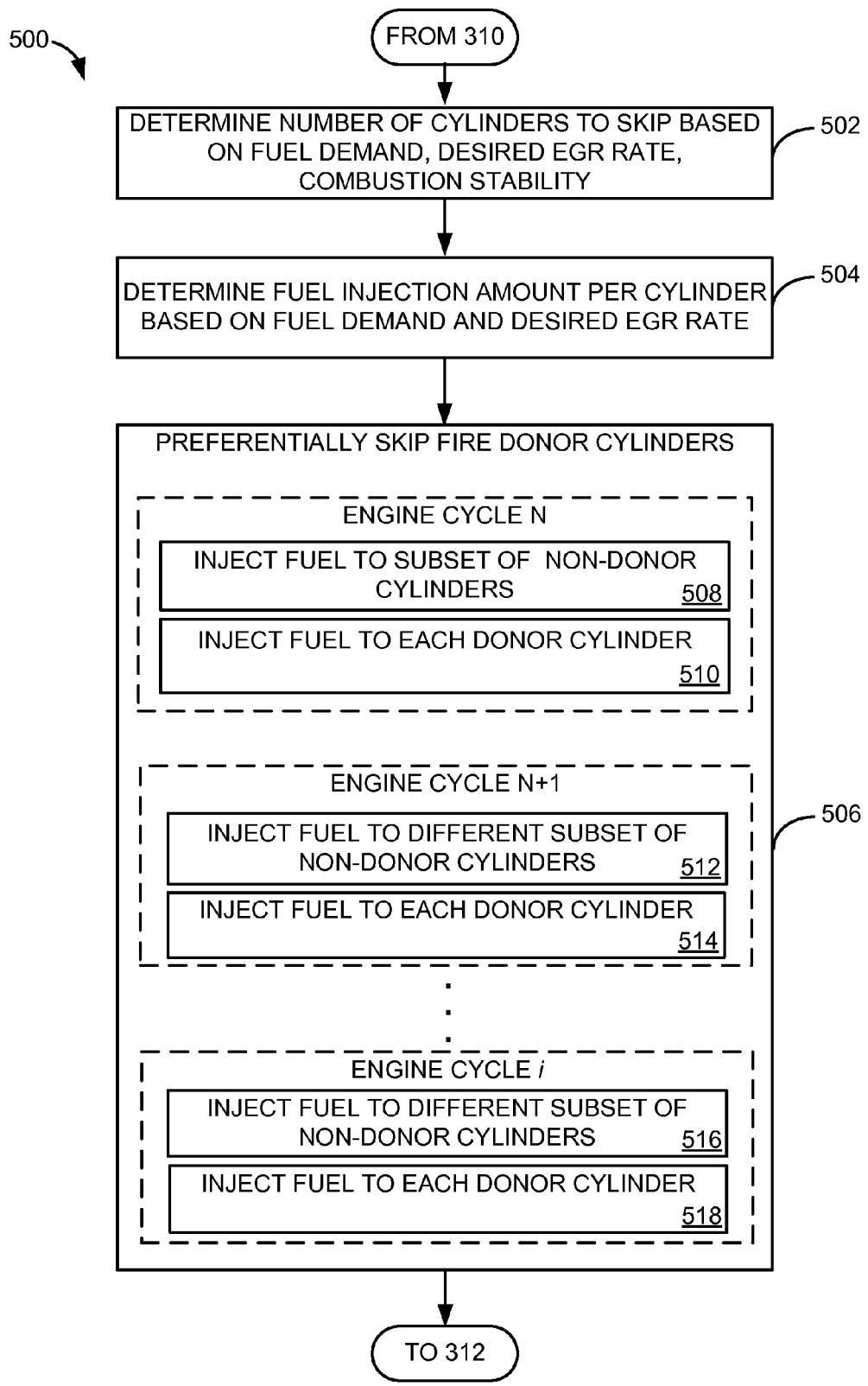
FIG. 5 shows a flow chart of an example method for performing a preferential donor cylinder skip fire routine.

Additional examples of operation among the various operating modes are described further with regard to FIGS. 3-5. FIG. 3 shows an example routine for an engine controller to determine a cylinder firing protocol, for example a preferential donor cylinder skip fire protocol or a non-preferential skip fire protocol. FIG. 4 shows a method for carrying out a non-preferential skip fire routine, and FIG. 5 shows a method for carrying out a preferential donor cylinder skip fire routine.

Turning to FIG. 3, a flow chart depicts a routine 300 for determining a cylinder firing protocol. Routine 300 may be carried out by controller 112 of engine 106, for example. Routine 300 comprises, at 302, determining if skip fire on conditions 304 have been met. Skip fire on conditions 304 may be based on one or a combination of various engine operating parameters. These conditions may include engine speed, fuel demand, and engine load being below predetermined respective thresholds. For example, during idle mode, engine speed may be low, such as 250 RPMs, and an operator may be requesting a low load setting on a notch throttle (e.g. idle notch). Thus, fuel demand, which is based on speed, load, and operating conditions such as engine temperature, manifold pressure, etc., may be too low, for example less than 180 mm$^3$ fuel per cylinder, to accurately deliver the desired amount of fuel. Additionally, skip fire operation may mitigate problems with cold engine operation, and as such, skip fire on conditions may be based on engine temperature. Skip fire on conditions may further be based on the controller sensing the engine is in a steady state operating condition, as transient operating conditions may require a fluctuating fuel demand. Steady state operating conditions may be determined by an amount of time spent at current throttle notch position, or any suitable method.

If skip fire on conditions are not met, routine 300 advances to 316 to initiate a non-skip fire routine. If conditions to initiate a skip fire routine are met, routine 300 advances to 306 and determines if an EGR rate is below a threshold. The EGR rate may be determined by a ratio of an amount of $CO_2$ in an intake manifold to an amount of $CO_2$ in the exhaust, as sensed by $CO_2$ sensors. The EGR rate may also be inferred from an amount of NOx in the exhaust, or any suitable mechanism. Target EGR rate may be determined based on a various engine operating conditions, including, for example, engine load, engine speed, combustion stability, and NOx emissions. If it is determined at 306 that the effective EGR rate is not below a desired rate, routine 300 advances to perform a non-preferential skip fire routine at 308. If it is determined at 306 that the effective EGR rate is below a desired rate, routine 300 advances to 310 to perform a preferential skip fire routine.

It is to be understood that the operations described above need not be carried out in the exact order described. In some embodiments, routine 300 may first determine that the EGR rate is below a threshold, and perform a preferential donor cylinder skip fire protocol even if the skip fire on conditions have not been met. For example, if the EGR rate is below a threshold and fuel demand is above the skip fire threshold, preferential donor cylinder skip fire may still be performed to increase the EGR rate.

Regardless of whether preferential or non-preferential skip fire operation is performed, routine 300 comprises, at 312, determining if skip fire off conditions are met. Once a skip fire routine is initiated, a predetermined period of time (e.g. one engine cycle) may elapse after which routine 300 may determine whether the conditions for skip fire on are still met, or whether conditions for skip fire off are met. Skip fire off conditions 314 may be based on one or more of engine speed, fuel demand, and engine load being above predetermined respective thresholds (e.g. engine operating in a middle or high-load mode), engine temperature, and transient engine operating conditions. If skip fire off conditions are not met at 312, the skip fire on routine may continue, and routine 300 may loop back to determine if EGR remains at a desired rate at 306. If skip fire off conditions are met at 312, routine 300 may advance to 316 to initiate a non-skip fire cylinder protocol, such as a standard cylinder firing protocol where all the cylinders are fired equally, or a protocol where no cylinders are fired, in order to initiate engine shut-down.

FIG. 4 is a flow chart of an example method 400 for performing a non-preferential skip fire routine. Method 400 may be performed as part of routine 300. Method 400 comprises, at 402, determining a number of cylinders to skip based on fuel demand. For example, during low-load engine mode, a fuel injection amount to each cylinder may be too small to be accurately delivered, and thus a number of cylinders to skip may be chosen to increase the fuel injection to the fired cylinders to an amount that can be delivered accurately. Fuel injection amounts to each fired cylinder may be determined based on fuel demand and the number of fired cylinders at 404. For example, if at 402 six out of twelve cylinders were selected to be skipped, the amount of fuel needed to meet desired fuel demand would be distributed to the remaining six cylinders, and thus each fired cylinder would receive a higher amount (e.g. twice the amount) of injected fuel than if all cylinders were fired. Method 400 further comprises, at 406, skip firing all cylinders. During engine cycle N, or the first engine cycle of the skip fire routine, fuel is injected to a subset of the donor and non-donor cylinders at 408. Following completion of engine cycle N, every cylinder in the subset will have fired, and in engine cycle N+1, the cylinders in the subset changes, such that fuel is injected to a different subset of donor and non-donor cylinders at 410. The subsets may be chosen based on fuel demand, and may distributed in such a manner to equally balance cylinder firing across multiple engine cycles. For example, engine 202 is a 12 cylinder engine with a firing order of 1-7-5-11-3-9-6-12-2-8-4-10. If six cylinders are fired, method 400 may fire cylinders 1-5-3-6-2-4 in the subset of engine cycle N and fire cylinders 7-11-9-12-8-10 in the subset of engine cycle N+1. In this way, each cylinder is fired once every two engine cycles. However, any suitable skip fire order is within the scope of this disclosure. At 412, method 400 comprises injecting fuel to a subset of donor and non-donor cylinders during engine cycle i. Engine cycle i represents any number of engine cycles within the skip fire routine, and the cylinders in the subset of fired cylinders may be similar to the subset of engine cycle N, may be similar to the subset of engine cycle N+1, or may be a different subset, depending on the chosen distribution of cylinder firing across the engine cycles.

In this way, a skip fire protocol may be performed whereby some cylinders are skipped each cycle. The remaining cylinders may receive an increased amount of fuel to increase the accuracy of fuel delivery. Each engine cycle, the cylinders that are skipped alternate in order to equally distribute the thermal load across all cylinders. Thus, across a predetermined number of engine cycles, every cylinder will be skipped equally.

Turning to FIG. 5, a flow chart of an example method 500 for performing a preferential skip fire routine is illustrated. Method 500 may be performed as part of routine 300. Method 500 comprises, at 502, determining a number of cylinders to skip based on fuel demand, desired EGR rate, and combustion stability. For example, during low-load engine mode, a fuel injection amount to each cylinder may be too small to be accurately delivered, and thus a number of cylinders to skip may be chosen to increase fuel injection amount to the fired cylinders to an amount that can be delivered accurately. Further, an effective EGR rate may be also required. EGR rate prior to initiation of a skip fire protocol may be determined based on relative concentrations of carbon dioxide in the intake vs. the exhaust, according to the following equation:

$$\frac{[CO_2 \text{intake}]}{[CO_2 \text{exhaust (total)}]}$$

In the example engine 202 as described above with respect to FIG. 2, wherein the four donor cylinders provide all their exhaust to the intake, where $CO_2$ production in each cylinder may be estimated based on fueling, and the total fuel demand remains constant across the cylinders, the EGR rate prior to skip fire may be determined by:

$$\frac{4\left(\frac{1}{12}x\right)}{12\left(\frac{1}{12}x\right)} = 0.33$$

Where x is the total amount of exhaust $CO_2$ produced as a result of combustion of the delivered fuel, and therefore $\frac{1}{12}x$ is the fraction of exhaust $CO_2$ produced in each cylinder, 4 is the number of donor cylinders providing exhaust gas to the intake, and 12 is the total number of cylinders. If a measured EGR rate is below a desired amount, a number of non-donor cylinders may be skipped to increase the effective EGR rate.

In a first example, one non-donor cylinder may be skipped per engine cycle. As a result, the fuel will be redistributed to eleven cylinders, and thus each fired cylinder will produce $\frac{1}{11}x$ of the total exhaust $CO_2$. The EGR rate in the combusting cylinders attained by skipping one non-donor cylinder may be calculated:

$$\frac{4\left(\frac{1}{11}x\right)}{11\left(\frac{1}{11}x\right)} = 0.36$$

As the amount of fuel to each cylinder increases, the amount of combusted gasses (e.g. $CO_2$) produced by each cylinder increases by an equal amount. In the equation above, eleven cylinders contribute to the $CO_2$ production of the engine. However, as the skipped cylinder still intakes and exhausts intake gasses, the total volume of intake and exhaust gas does not change compared to operation with all twelve cylinders firing, only the proportion of $CO_2$ produced in each cylinder, and thus the proportion of $CO_2$ in the intake.

To increase the EGR rate by a larger amount, more cylinders may be skipped each cycle. In a second example, two non-donor cylinders may be skipped each cycle, with the fuel, and thus the $CO_2$ production, being distributed to ten cylinders each cycle and thus each cylinder produces $\frac{1}{10}x$ of the total $CO_2$, resulting in an EGR rate of:

$$\frac{4\left(\frac{1}{10}x\right)}{10\left(\frac{1}{10}x\right)} = 0.40$$

EGR rates may be calculated in a similar manner for each number of cylinders skipped. Skipping three non-donor cylinders (and not skipping any donor cylinders) will result in an EGR rate of 0.44, skipping four non-donor cylinders will result in an EGR rate of 0.5, skipping five non-donor cylinders will result in an EGR rate of 0.57, and so on until all cylinders other than the donor cylinders are skipped, which will result in an effective EGR rate of 1.0. However, the EGR rate may be need to kept under a threshold in order to maintain combustion stability, as the diminished amount of oxygen in the intake as a result of the EGR may not be a high enough level to sustain combustion. On the other hand, very high levels of EGR may be useful at low load conditions where air/fuel ratios tend to be very high. As such, donor cylinders may be more preferentially fired (and thus non-donor cylinder more preferentially skipped) as engine load decreases and/or as air/fuel ratio increases, and vice versa. For the V-12 example with four donor cylinders, at a first, lower engine load, four of eight non-donor cylinders may be fired (and thus four skipped), while all four donor cylinders are fired each engine cycle, while at a second, higher engine load relative to the first load, two of eight non-donor cylinders may be skipped (and thus six fired) again with all non-donor cylinders firing in each engine cycle.

Further, it may be possible to perform preferential skip-fire operation in donor cylinders by skipping more non-donor cylinders than donor cylinders, but yet still skipping at least one donor cylinder as well. For example, two non-donor cylinders may be skipped while skipping only one donor cylinder. Such operation may enable further refinement in the adjustment of the effective EGR rate.

Once a number of cylinders to skip to obtain a desired EGR rate has been determined at 502, the fuel injection amounts to each fired cylinder may be determined based on fuel demand, the number of injected cylinders, and the desired EGR rate at 504. For example, if at 502 six out of twelve cylinders were selected to be skipped, the amount of fuel needed to meet desired fuel demand would be distributed to the remaining six cylinders, and thus each fired cylinder would receive a higher amount (e.g. twice the amount) of injected fuel than if all cylinders were fired. However, if the number of skipped cylinders does not come close enough to reaching a desired EGR rate (for example, the desired EGR rate is 0.6 and skipping five cylinders results in a rate of 0.57 while skipping six cylinders results in a rate of 0.65), an amount of fuel delivered to each donor cylinder may be adjusted to reach the desired rate. Because the $CO_2$ production, and as a result the effective EGR rate, is proportional to an amount of fuel delivered to the donor cylinders, the amount of fuel injected to each donor cylinder may be increased or decreased, and an amount delivered to each fired non-donor cylinder may be adjusted accordingly to maintain required engine speed. Thus, the air/fuel ratio of the donor cylinders may be adjusted such that the air/fuel ratio of the donor cylinders is different from the air/fuel ratio of the non-donor cylinders. In this example, four donor cylinders would operate with fueling that is higher than the fueling delivered to the firing non-donor cylinders, where six non-donor cylinders are skipped each combustion cycle. Further, as described herein, among the six non-donor cylinders that are skipped each combustion cycle, a different subset may be skipped each cycle such that eventually each non-donor cylinder fires.

Continuing with FIG. 5, method 500 further comprises, at 506, preferentially skip firing the donor cylinders. For example, during engine cycle N, or the first engine cycle of the preferential skip fire routine, fuel is injected to a subset of the non-donor cylinders at 508, and to each donor cylinder at 510. Following completion of engine cycle N, every cylinder in the subset will have fired, and in engine cycle N+1, fuel is injected to a different subset of non-donor cylinders at 512 and each donor cylinder at 514. The subsets may be chosen based on fuel demand and EGR rate, and may be distributed in such a manner to equally balance cylinder firing across multiple engine cycles. At 516, method 500 comprises injecting fuel to a subset of non-donor cylinders during engine cycle i. Engine cycle i represents any number of an engine cycle within the preferential skip fire routine, and the cylinders in the subset of fired cylinders may be similar to the subset of engine cycle N, may be similar to the subset of engine cycle N+1, or may be a different subset, depending on the chosen distribution of cylinder firing across the engine cycles. Method 500 further comprises, at 518, injecting fuel to each donor cylinder in engine cycle i.

Performing method 500 to achieve a target EGR rate of 0.36, as described in the first example above, results in a skip fire protocol where one non-donor cylinder is skipped each engine cycle. If the engine comprises four donor cylinders and fires in the order described with respect to FIG. 2, a non-skip fire protocol would result in an engine firing order of 1-7-5D-11-3-9D-6-12-2D-8-4-10D where D indicates donor cylinder. An example of a preferential skip fire protocol where one cylinder is skipped each engine cycle is 7-5D-11-3-9D-6-12-2D-8-4-10D-1-5D-11-3-9D-6-12-2D-8-4-10D-1-7-5D-3-9D-6-12-2D-8-4-10D, etc. In this protocol, every eight engine cycles, each non-donor cylinder is fired seven times while each donor cylinder is fired eight times.

In a second example, if a target EGR rate of 0.525 is desired, a preferential skip fire protocol where four non-donor cylinders are skipped each engine cycle may be performed. An example skip fire protocol may be 7-5D-3-9D-12-2D-4-10D-1-5D-11-9D-6-2D-8-10D, where each non-donor cylinder is fired once every two engine cycles. Thus, in two engine cycles, each non-donor cylinder is fired once while each donor cylinder is fired twice. Further, the skip fire protocol equally balances thermal load across the cylinder banks. However, as a first engine cycle ends and a second engine cycle begins, the skip fire protocol described above will comprise uneven firing (three sequential fires with no intervening skips), which may result in uneven running of the engine. Thus, the chosen skip fire protocol may be selected in order to include even firing and thus even running of the engine.

The skip fire protocol where four non-donor cylinders are skipped each engine cycle results in an EGR rate of 0.5, with each fired cylinder receiving 12% of the total injected fuel, and thus contributing to 12% of the total $CO_2$ produced. To reach the target EGR rate of 0.525, fuel injection amounts to the donor cylinders may be increased. For example, if the donor cylinders each receive 13.1% of the injected fuel, and thus produce $1/7.62$ of the total $CO_2$, and each fired non-donor cylinder receives 11.9% of the injected fuel, and thus produces $1/8.42$ of the total $CO_2$, the EGR rate will be 0.525:

$$\frac{4\left(\frac{1}{7.62}x\right)}{4\left(\frac{1}{7.62}x\right)+4\left(\frac{1}{8.42}x\right)} = \frac{0.525x}{0.525x + 0.475x} = 0.525$$

Thus, method 500 provides for preferentially skip firing donor cylinders and/or adjusting fuel injection amounts to reach a target effective EGR rate. By selecting a number of non-donor cylinders to skip, the relative proportion of combusted gasses in the intake can be controlled. In this way, NOx emissions may be controlled while increasing accuracy of fuel delivery.

Another embodiment relates to a method for controlling EGR rate in an internal combustion engine. The method comprises routing exhaust from a first cylinder group to an intake coupled to the engine, and not to atmosphere. The method further comprises routing exhaust from a second cylinder group to atmosphere. The method further comprises, during a first engine operating condition, injecting fuel to each cylinder in the first cylinder group while injecting fuel to a subset of cylinders of the second cylinder group. The first cylinder group comprises all cylinders of the engine whose exhausts (e.g., exhaust ports) are coupled to the engine intake and not to atmosphere. The second cylinder group comprises all cylinders of the engine whose exhausts are coupled to atmosphere.

An embodiment relates to an engine system. The engine system comprises an air intake, an exhaust, and an engine block. The engine block has a first cylinder group and a second cylinder group. Exhaust ports of the cylinders of the first cylinder group are fluidly coupled to the intake and not to the exhaust or otherwise to atmosphere. Exhaust ports of the cylinders of the second cylinder group are fluidly coupled to the exhaust. The engine system further comprises a fuel injection system operably coupled to the cylinders of the first cylinder group and the second cylinder group for controllably injecting fuel into the cylinders. The engine system further comprises a controller for controlling the fuel injection system. The controller is configured to control the fuel injection system, during a first engine operating condition, to inject fuel to each cylinder in the first cylinder group and concurrently inject fuel to a subset of cylinders of the second cylinder group.

An embodiment relates to an engine system. The engine system comprises an air intake, an exhaust, and an engine block. The engine block has a donor cylinder group and a non-donor cylinder group. Exhaust ports of the cylinders of the donor cylinder group are fluidly coupled to the intake and not to the exhaust or otherwise to atmosphere. Exhaust ports of the cylinders of the non-donor cylinder group are fluidly coupled to the exhaust. The engine system further comprises a fuel injection system operably coupled to the cylinders of the donor cylinder group and the non-donor cylinder group for controllably injecting fuel into the cylinders. The engine system further comprises a controller for controlling the fuel injection system. The controller is configured to determine a target EGR rate. The controller is further configured to control the fuel injection system to inject fuel to each cylinder of a donor cylinder group, and to inject fuel to a subset of cylinders of the non-donor cylinder group. The controller is further configured to adjust a number of cylinders of the subset of cylinders of the non-donor cylinder group (i.e., to change the number of cylinders of the non-donor cylinder group into which fuel is injected) to obtain the target EGR rate.

An embodiment relates to an engine system. The engine system comprises an air intake, an exhaust, and an engine block. The engine block has a donor cylinder group and a non-donor cylinder group. Exhaust ports of the cylinders of the donor cylinder group are fluidly coupled to the intake and not to the exhaust or otherwise to atmosphere. Exhaust ports of the cylinders of the non-donor cylinder group are fluidly coupled to the exhaust. The engine system further comprises a controller for controlling the engine system. The controller is configured to control firing of the cylinders such that during a plurality of engine cycles, each cylinder from the donor cylinder group is fired more often than each cylinder from the non-donor cylinder group.

Other embodiments relate to non-transitory computer readable storage media having one or more sets of instructions stored thereon, that when executed by a controller, cause the controller to perform one or more of the functions described herein. For example, in one embodiment, the instructions, when executed by a controller, may cause the controller to determine a target EGR rate, control a fuel injection system to inject fuel to each cylinder of a donor cylinder group and to inject fuel to a subset of cylinders of the non-donor cylinder group, and to control the fuel injection system for adjusting a number of cylinders of the subset of cylinders of the non-donor cylinder group to obtain the target EGR rate.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling EGR rate in an internal combustion engine, comprising:
routing exhaust from a first cylinder group exclusively to an intake coupled to the engine, and not to atmosphere;
routing exhaust from a second cylinder group to atmosphere; and
during a first engine operating condition where an engine fuel demand is below a threshold demand, injecting fuel to each cylinder in the first cylinder group while injecting fuel to a subset of cylinders of the second cylinder group, where a number of cylinders of the subset of cylinders of the second cylinder group decreases in response to an increase in a target EGR rate.

2. The method of claim 1, wherein injecting fuel to the subset of the cylinders of the second cylinder group further comprises injecting fuel to at least one but fewer than all the cylinders of the second cylinder group over a single engine cycle.

3. The method of claim 1, further comprising adjusting an air/fuel ratio of the cylinders of the first cylinder group such that the air/fuel ratio of the cylinders of the first cylinder group is different from an air/fuel ratio of the cylinders of the second cylinder group.

4. The method of claim 1, further comprising during the first engine operating condition, adjusting fuel injection to one or more cylinders of the first cylinder group and the subset of the cylinders of the second cylinder group to control engine speed.

5. The method of claim 1, wherein the first engine operating condition further comprises an idle mode.

6. The method of claim 1, wherein the first engine operating condition further comprises a low-load mode.

7. The method of claim 1, wherein the number of cylinders in the subset of the cylinders of the second cylinder group is selected based on plural second engine operating conditions.

8. The method of claim 7, wherein the plural second engine operating conditions comprise one or more of engine speed, engine load, combustion stability, and EGR rate.

9. The method of claim 1, further comprising during a third engine operating condition, injecting fuel to each cylinder in the first cylinder group and injecting fuel to each cylinder in the second cylinder group.

10. The method of claim 9, wherein the third engine operating condition comprises a middle or high-load mode.

11. The method of claim 1, wherein the cylinders comprising the subset of cylinders of the second cylinder group changes after a first predetermined number of engine cycles such that each cylinder of the second cylinder group does not receive the injected fuel at least once within a second predetermined number of engine cycles.

12. A method of operating an internal combustion engine, comprising:
responsive to an effective exhaust gas recirculation (EGR) rate being below a target EGR rate, during a plurality of engine cycles, firing each cylinder from a first cylinder group more often than each cylinder from a second cylinder group, the first cylinder group comprising donor cylinders and the second cylinder group comprising non-donor cylinders.

13. The method of claim 12, wherein firing each cylinder from the first cylinder group more often than each cylinder from the second cylinder group further comprises injecting fuel to each cylinder of the first cylinder group and injecting fuel to at least one but fewer than all the cylinders of the second cylinder group over a single engine cycle.

14. The method of claim 12, wherein the plurality of engine cycles occurs during a low-load mode of the engine.

15. The method of claim 12, wherein firing each cylinder from the first cylinder group more often than each cylinder from the second cylinder group further comprises firing each cylinder from the first cylinder group more often than each cylinder from the second cylinder group to reach the target EGR rate.

16. The method of claim 15, wherein the target EGR rate is based on one or more of engine load, engine speed, combustion stability, and NOx emissions.

17. A method for controlling an EGR rate, comprising:
injecting fuel to each cylinder of a donor cylinder group;
injecting fuel to a subset of cylinders of a non-donor cylinder group; and
adjusting a number of cylinders of the subset of cylinders of the non-donor cylinder group based on a determined target EGR rate, including decreasing the number of cylinders in response to an increase in the determined target EGR rate.

18. The method of claim 17, wherein the target EGR rate is determined based on one or more of engine load, engine speed, combustion stability, and NOx emissions.

19. The method of claim 17, further comprising adjusting an amount of fuel injected to each cylinder of the donor cylinder group and each cylinder of the subset of cylinders of the non-donor cylinder group to obtain a desired engine speed.

20. The method of claim 17, wherein an amount of fuel injected to each cylinder of the donor cylinder group is different than an amount of fuel injected to each cylinder of the subset of cylinders of the non-donor cylinder group.

21. A method, comprising:
 selectively skipping one or more non-donor cylinders in an engine having pluralities of both donor and non-donor cylinders based at least in part on a determined speed of the engine and a target EGR rate.

* * * * *